United States Patent
Martin et al.

(10) Patent No.: US 9,726,397 B1
(45) Date of Patent: Aug. 8, 2017

(54) COLLECTION AND TREATMENT OF CONDENSATE FROM CLIMATE CONTROL EQUIPMENT

(71) Applicants: Chad Martin, Los Altos, CA (US); Robert Joseph Wieland, Rolling Hills Estates, CA (US)

(72) Inventors: Chad Martin, Los Altos, CA (US); Robert Joseph Wieland, Rolling Hills Estates, CA (US)

(73) Assignee: DripCycle, LLC, Mountain View, CA (US)

( * ) Notice: Subject to any disclaimer, the term of this patent is extended or adjusted under 35 U.S.C. 154(b) by 0 days.

(21) Appl. No.: 15/299,431

(22) Filed: Oct. 20, 2016

(51) Int. Cl.
*C02F 1/46* (2006.01)
*F24F 13/22* (2006.01)
*C02F 1/78* (2006.01)
*C02F 1/68* (2006.01)
*C02F 1/36* (2006.01)

(52) U.S. Cl.
CPC ............... *F24F 13/22* (2013.01); *C02F 1/36* (2013.01); *C02F 1/68* (2013.01); *C02F 1/78* (2013.01); *C02F 2201/461* (2013.01); *C02F 2201/782* (2013.01); *C02F 2201/784* (2013.01); *C02F 2305/02* (2013.01); *F24F 2013/228* (2013.01)

(58) Field of Classification Search
CPC .... E03B 3/28; C02F 1/68; C02F 1/78; H01M 2250/40; Y02E 60/56; F25D 17/04; F25D 21/14
See application file for complete search history.

(56) References Cited

U.S. PATENT DOCUMENTS

| | | |
|---|---|---|
| 2007/0189972 A1 | 8/2007 | Chiba |
| 2007/0295021 A1* | 12/2007 | Tyls .......................... E03B 3/28 62/285 |
| 2013/0284679 A1 | 10/2013 | Bailin |

* cited by examiner

*Primary Examiner* — Walter D Griffin
*Assistant Examiner* — Cameron Allen
(74) *Attorney, Agent, or Firm* — David Crites

(57) ABSTRACT

A device, method, and system may recover, treat, and reuse condensate that is produced by climate control equipment. Minerals that are beneficial for both the intended use of the condensate and the formation of persistent ozone containing bubbles may be introduced into the condensate. An ozone containing gas may be introduced in to the condensate.

15 Claims, 4 Drawing Sheets

```
┌─────────────────────────────────────────────────────────────────────────────┐
│ collecting a condensate in a collector; and placing an ozone containing gas into the collector; │
└─────────────────────────────────────────────────────────────────────────────┘
                                       ↓
┌─────────────────────────────────────────────────────────────────────────────┐
│ wherein the placing comprises mixing bubbles of the ozone containing gas into a mineral water │
│ and introducing the mineral water into the condensate of the collector; the bubbles having a first │
│ diameter less than one of: 50 microns, 10 microns, 2 microns, 1 micron, 0.5 microns, and 0.2 │
│ microns; wherein the mineral water has an electrical conductivity of at least 300 µS/cm; │
└─────────────────────────────────────────────────────────────────────────────┘
                                       ↓
┌─────────────────────────────────────────────────────────────────────────────┐
│ transforming the condensate into a mineral water by adding into the condensate ions of at least │
│ one of: nitrogen, phosphorus, potassium, sulfur, copper, molybdenum, zinc, boron, cobalt, │
│ nickel, chlorine, aluminum, silicon, vanadium, and selenium; │
└─────────────────────────────────────────────────────────────────────────────┘
                                       ↓
┌─────────────────────────────────────────────────────────────────────────────┐
│ wherein the mixing comprises using at least one of: a porous diffuser; a mechanical actuator │
│ configured to move the mineral water at a high shear rate relative to the gas; a nozzle configured │
│ to combine the mineral water and gas at a high relative shear rate; an injector configured to │
│ inject the gas into a pressurized portion of the mineral water and a mechanical actuator │
│ configured to pressurize and depressurize the pressurized portion of the mineral water; an │
│ injector configured to inject the bubbles having a second diameter that is greater than the first │
│ diameter and an agitator configured to abruptly break the bubbles having the second diameter │
│ into the bubbles having the first diameter; and an electrolysis unit having an anode and cathode; │
└─────────────────────────────────────────────────────────────────────────────┘
                                       ↓
┌─────────────────────────────────────────────────────────────────────────────┐
│ wherein the agitator comprises at least one of: an electric discharge unit having an anode and │
│ cathode; an ultrasonic transducer; a mechanical actuator that moves the condensate; and │
│ structures that cause turbulence in the condensate. │
└─────────────────────────────────────────────────────────────────────────────┘
```

Figure 4

COLLECTION AND TREATMENT OF CONDENSATE FROM CLIMATE CONTROL EQUIPMENT

FIELD OF TECHNOLOGY

This disclosure relates generally to the field of condensate recovery, treatment, and reuse. More specifically to the recovery, treatment, and reuse of condensate from climate control equipment.

BACKGROUND

In a region of average humidity a 4 ton central air conditioner unit may produce a half a gallon of condensate per hour. Capturing and reusing condensate is a responsible way to reuse a limited natural resource. Condensate has little mineral content, though it may contain bacterial contamination.

Bacterial contamination of condensate may be treated with a variety of equipment and methods. Grey-water treatment systems may use chlorine as a disinfectant. (See e.g. U.S. Patent Publication 20130284679 Bailin.) One alternative to chlorine is ozone, which has been shown to have a bactericidal effect on organisms. (See e.g. U.S. Patent Publication 20070189972 Chiba, "Chiba".) Chiba teaches the formation of nanobubbles with a diameter of 1 μm or less, and states that the nanobubbles may persist in the bulk liquid for one or more months. Chiba, however, provides no apparatus or method for in situ treatment of condensate from climate control equipment, which is not sufficiently electrically conductive for the formation of persistent nanobubbles.

Therefore, it is an object of this invention to provide for the in situ capture and treatment of condensate produced by climate control equipment. It is further an object of this invention to provide for the reuse of condensate by introducing minerals into the condensate that are beneficial for both its intended use and the formation of persistent ozone bubbles.

SUMMARY

In one or more embodiments a method, apparatus, or system may collect, treat, and reuse a condensate that is produced by climate control equipment. The apparatus and system may comprise an ozone generator that produces ozone containing gas. The method may comprise placing an ozone containing gas into the condensate. The method, apparatus and system may further comprise a mineralizer configured to transform the condensate into a mineral water by adding mineral ions into the condensate. The method, apparatus and system may further comprise a bubble generator that is configured to mix bubbles of the ozone containing gas into the resulting mineral water.

Other embodiments will be apparent from the following description and the appended claims.

BRIEF DESCRIPTION OF THE DRAWINGS

Example embodiments are illustrated by way of example and not limitation in the figures of accompanying drawings, in which like references indicate similar elements and in which:

FIG. 4 is a block diagram illustrating the condensate treatment method in one embodiment.

Figure 1:
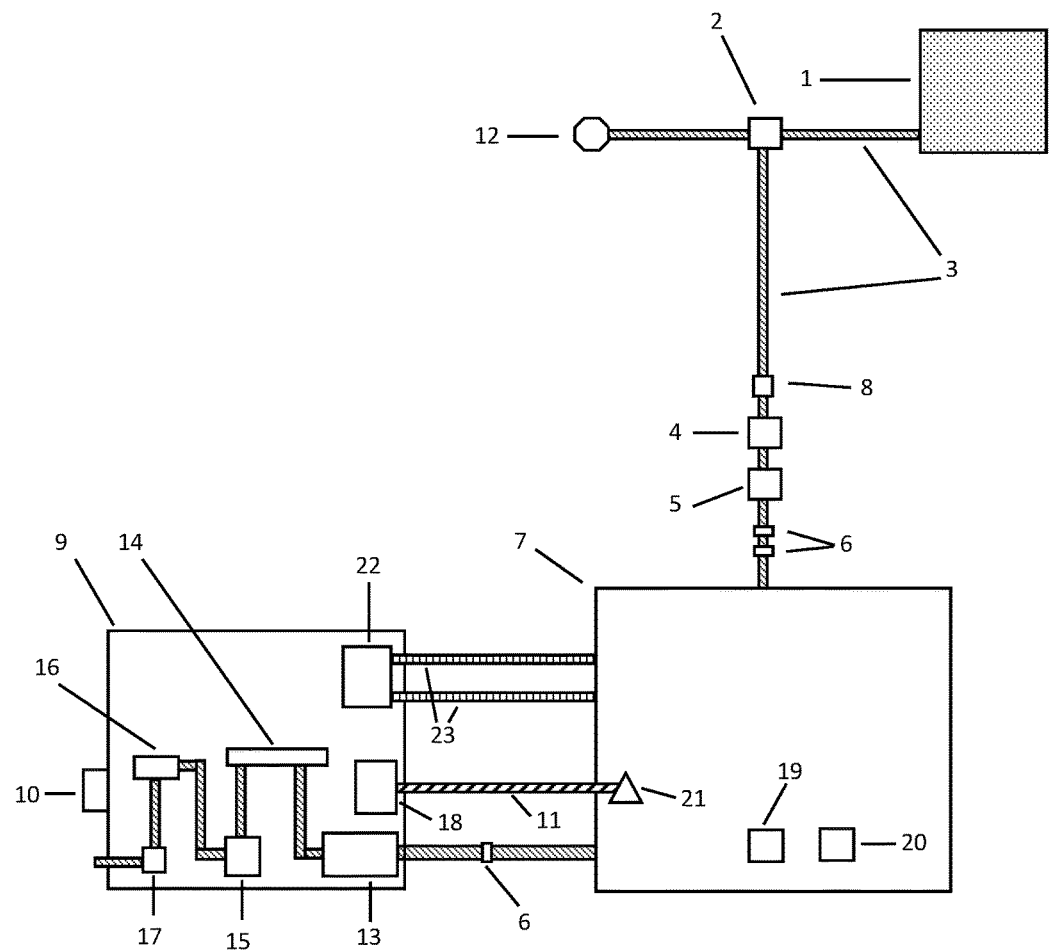
FIG. 1 is a block diagram illustrating the condensate treatment device and method in a first embodiment.
Figure 2:
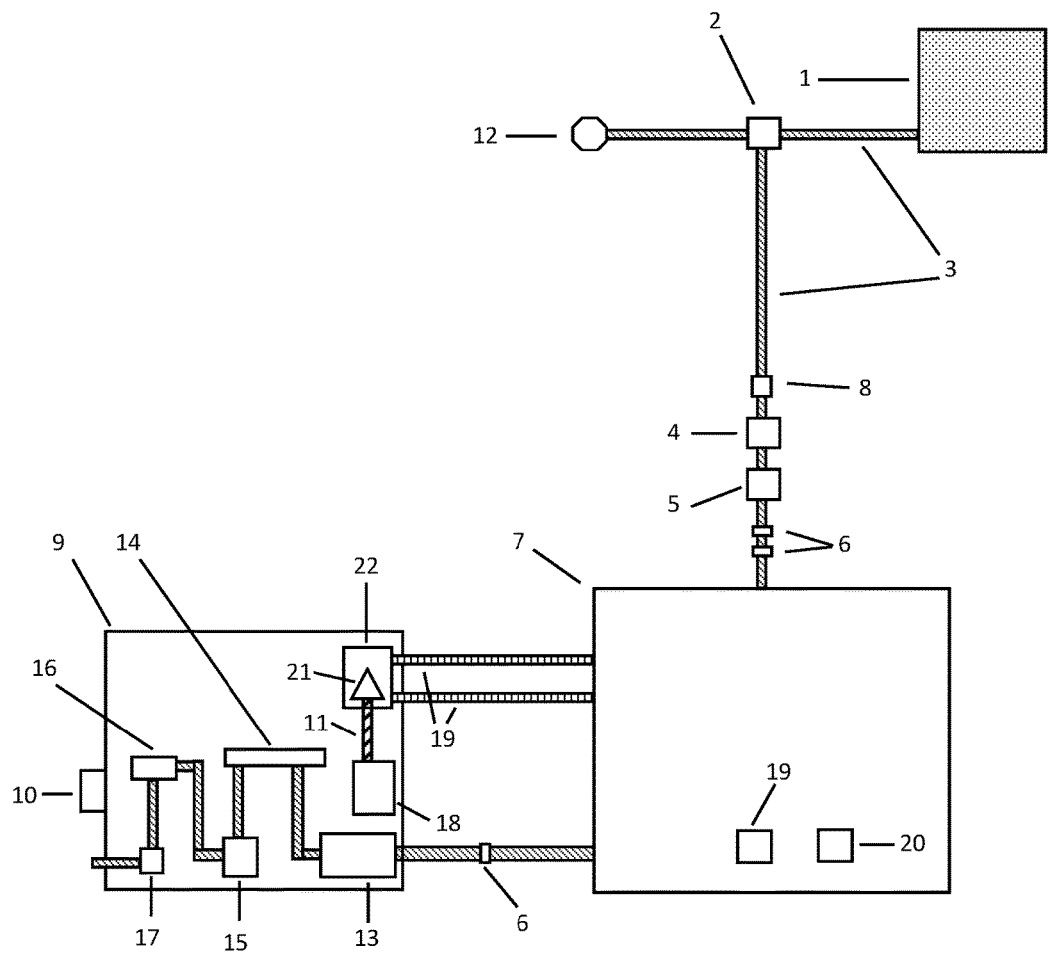
FIG. 2 is a block diagram illustrating the condensate treatment device and method in a second embodiment.
Figure 3:
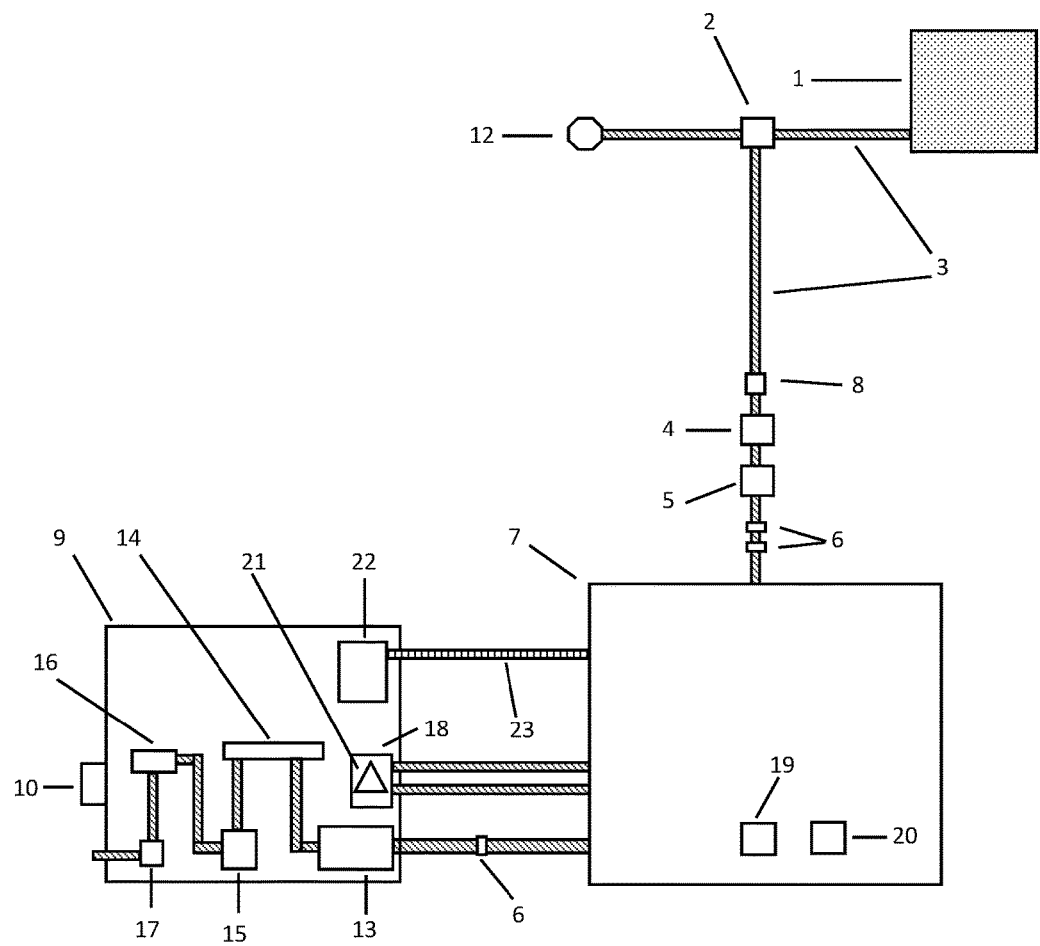
FIG. 3 is a block diagram illustrating the condensate treatment device and method in a third embodiment.

Other features of the present embodiments will be apparent from the accompanying Drawings and from the Detailed Description that follows.

DETAILED DESCRIPTION

In one or more embodiments a method, apparatus, or system for the collection, treatment, and reuse of condensate may comprise one or more: climate control units 1 (e.g. air conditioning unit, heating unit, ventilation unit, humidity control unit, or refrigeration unit) that produce condensate, valves 2, piping 3+23, strainers 4, mineralizers 22, copper/silver ionizers 5, pipe joints 6, collectors 7 (e.g. tanks), sensors 8+20, alarms 8, electronic controls 10, drains 12, pumps 13, ultraviolet lights 14, filters 15, meters 16, regulators 17, ozone generators 18, gas tubing 11, bubble generators 21, and circulators 19. Climate control units 1 may produce condensation when moist air experiences a drop in temperature. Condensation may be directed to a drain 12 or may be collected in a collector 7. Valves 2 or regulators 17 may be used to regulate, direct, or control the flow or pressure of the condensate in piping 3+23 and pipe joints 6. Strainers 4 and filters 15 may separate debris or particles from the condensate. Mineralizers 22 may dissolve minerals into the condensate to improve the condensate for its intended use and to cause bactericidal ozone to persist for extended periods in the condensate. Copper/silver ionizers 5 may introduce at least one of copper and silver ions into the condensate. Sensors 8+20 and meters 16 may detect, prevent, alter, manage, or measure: an overflow of the collector 7, a fluid or gas pressure, a fluid level or depth, a presence of a gas or a fluid, a fluid or gas flow or velocity, an electrical conductivity of a gas or fluid, a pH of fluid, an ozone or gas content, a light refraction in a gas or fluid, or another property of gas or fluid. Alarms 8 may alert a person, produce an electronic control 10, actuate a valve 2, or signal other equipment. Electronic controls 10 may time events, collect data, actuate valves 2, interact with users, produce alarms 8, provide power, and control the apparatus. In order to simplify the Drawings, the electrical control wires and connections are not shown in the Drawings. Drains 12 may use gravity to drain a liquid. Pumps 13 may use mechanical action to move a fluid. Ultraviolet lights 14 that produce wavelengths near 254 nm may be used to inhibit bacteria growth. Ozone generators 18 may produce ozone containing gas. Gas tubing 11 may inject bactericidal ozone containing gas in the collected condensate or a portion of the condensate. Circulators 19 may circulate the condensate in the collector 7.

Ozone may inhibit bacterial growth in the condensate. In one embodiment, an ozone unit 9 may comprise an ozone generator 18 that produces ozone containing gas. The ozone containing gas may be produced by corona discharge, ultraviolet radiation, electrolysis, and radiochemical methods. Corona discharge is created when a high voltage passes through an air gap. The high voltage provides the energy necessary for disassociating some of the O2 molecules in the air gap and allows the formation of ozone. Ultraviolet radiation at wavelengths near 185 nm may be used to create ozone by disassociating O2 molecules, and ultraviolet radiation may also be used to destroy ozone at wavelengths near 254 nm. Electrolysis produces ozone when an electric current is passed through a liquid (e.g. the condensate, mineral water, or another electrolyte) causing the evolution of ozone containing gas. In electrolysis, an ion exchange membrane may function as both an electrode separator and electrolyte.

In one embodiment the ozone unit 9 may place the ozone containing gas into the collector 7 or the condensate. In another embodiment the ozone unit 9 may place the ozone containing gas into a mineralizer 22 that is fluidly connected to the collector 7. The ozone unit 9 may then place the ozone-treated contents of the mineralizer 22 into the collector 7 through the fluid connection.

In one embodiment the ozone unit 9 may comprise a bubble generator 21 that mixes bubbles of ozone containing gas into the condensate or mineral water, the bubbles having a diameter less than one of: 100 microns, 50 microns, 10 microns, 2 microns, 1 micron, 0.5 microns, and 0.2 microns. Bubble size is critical because larger bubbles are less persistent and less effective than smaller bubbles.

The longevity of ozone containing bubbles is correlated with the charge density on the bubbles' surface. In addition, bubble buoyancy is correlated with bubble size. Furthermore, the disinfection effectiveness of ozone is inversely correlated with bubble size. Thus, small ozone containing bubbles (e.g. <1 μm) with sufficient surface-charge density may be more stable in solution, may be neutrally buoyant, and may be more effective at controlling bacteria. Small ozone containing bubbles formed in an electrolytic solution acquire surface charge from the solution. On small bubbles, the surface charge density counteracts the surface tension of the bubbles and the bubble surfaces reach an equilibrium that extends the longevity and efficacy of the bubbles. In one embodiment, the condensate may be transformed into mineral water (i.e. an electrolytic solution) by the addition of minerals and the ozone unit 9 may then add ozone containing gas into the mineral water. In this embodiment, the ozone unit 9 may comprise a mineralizer 22 that transforms the condensate into mineral water by adding mineral ions into the condensate. The mineralizer 22 may comprise a first mineralizer pump or gravity feed that withdraws condensate from the collector 7 into a container, and a second mineralizer pump or gravity feed that deposits mineral water from the container into the collector 7. In one embodiment, the first mineralizer pump and second mineralizer pump may be the same pump. In one embodiment, the first mineralizer pump or the second mineralizer pump may be the same pump as the condensate agitator 19. Mineral water piping 23 may convey the condensate from the collector 7 to the mineralizer 22, and may convey the mineral water from the mineralizer 22 to the collector 7. In one embodiment, a mineral water (e.g. a mineral water that does not comprise the condensate) may be introduced into the mineralizer 22, ozone added into the mineral water, and then the treated mineral water added to the condensate. In yet another embodiment, a mineral water may be introduced into the mineralizer 22, the condensate transformed into mineral water by adding the mineral water into the condensate, and then ozone containing gas added into the mineral water.

In one embodiment, the mineralizer may be periodically refreshed by adding mineral water (e.g. sea water, fertilizer concentrate, or another mineral water for human, plant, or animal consumption). In another embodiment, the mineralizer may be refreshed by adding minerals (e.g. soluble minerals) and condensate to the mineralizer.

In one embodiment, minerals or mineral water may be added to the condensate after the condensate is held in the collector 7, after the condensate passes through a pump 13, or after the condensate passes through other equipment (e.g. 14, 15, 16, 17). This embodiment delays the introduction of minerals in order to spare the collector 7, pump, or other equipment the potentially problematic effects of scale deposits or galvanic corrosion. In another embodiment, minerals or mineral water may be added to the condensate in the collector 7 in order to increase the longevity and antibacterial efficacy of ozone containing bubbles added to the collector 7. In this embodiment the long-lasting ozone containing bubbles may act to inhibit bacterial growth in the collector 7. In either embodiment, the minerals or mineral water, and the mineral concentrations, may be selected based on the intended use of the mineral water that is produced from the condensate.

In one embodiment an intended use of the mineral water may be for the irrigation of plants. In this embodiment the mineral water may contain plant nutrients that are necessary or helpful for the growth or health of one or more plants. Plant nutrients may be added to the condensate in order to produce a mineral water that is beneficial for plant health or growth. Mineral nutrients for plants may comprise: nitrogen, phosphorus, potassium, calcium, sulfur, magnesium, boron, chlorine, manganese, iron, zinc, copper, molybdenum, nickel, sodium, cobalt, aluminum, silicon, vanadium, and selenium. In one embodiment, the condensate or mineral water may be essentially free of chlorine.

In one embodiment an intended use of the mineral water may be for human or animal consumption. In this embodiment the mineral water may contain nutrients that are necessary or helpful for the growth or health of humans or animals. Nutrients may be added to the condensate in order to produce a mineral water that is beneficial for the health or growth of humans or animals. Mineral nutrients for humans or animals may comprise: magnesium, iron, cobalt, copper, zinc, sodium, potassium, chlorine, calcium, phosphorous, manganese, molybdenum, iodine, selenium, boron, chromium, arsenic, bromine, fluorine, nickel, lithium, strontium, vanadium, tungsten, cadmium, aluminum, germanium, lead, rubidium, tin, and silicon. In one embodiment, the condensate or mineral water may be essentially free of chlorine.

In one embodiment, the mineral water may have an electrical conductivity of at least 300 μS/cm. In one embodiment, the mineral water may have an electrical conductivity of at least 200 μS/cm or 250 μS/cm. The electrical conductivity of the mineral water is critical because the conductivity is correlated with the concentration of ions and thus with the stabilizing surface charge on the bubbles. The electrical conductivity of the mineral water is also critical because the conductivity is correlated with the concentration of ions that may be beneficial for the intended use of the treated condensate (e.g. plant irrigation, human or animal consumption).

In one embodiment the bubble generator 21 may comprise a porous diffuser. For example, the bubble generator 21 may comprise a porous polymer, ceramic, stone, silica, or another material with fine pores). In one embodiment the bubble generator 21 may comprise a mechanical actuator configured to move the mineral water at a high shear rate relative to the gas. For example, the bubble generator 21 may comprise an atomizer, or another mechanical device that combines liquid and gas at a high speed. Such an atomizer may comprise a vibrating element, oscillator, or another device for pulsing the liquid or gas. Such an atomizer may comprise rotating elements for shearing the gas. In one embodiment the bubble generator 21 may comprise a nozzle configured to combine the mineral water and gas at a high relative shear rate. For example, the bubble generator 21 may comprise a spray nozzle, spew-nozzle, diffuser, or Venturi device. In one embodiment the bubble generator 21 may comprise a mechanical actuator configured to pressurize a portion of the mineral water and an injector configured to inject the gas into the pressurized portion of the mineral water. For example, the bubble generator 21 may comprise a unit that applies an increased pressure on a portion of the liquid and injects the gas into the pressurized portion of the liquid. Such a unit may comprise a pump. In one embodiment the bubble generator 21 may comprise an injector configured to inject the bubbles having a second diameter that is greater than the first diameter and an agitator configured to abruptly break the bubbles having the second diameter into the bubbles having the first diameter. For example, the agitator may comprise ridges, walls, vortex features, turbulence features, a pump, a vibrator, an oscillator, an agitator, a nozzle, a Venturi device, or another mixing device. In one embodiment the bubble generator 21 may comprise an electrolysis unit having an anode and cathode. Such an electrolysis unit may be configured to pass an electric current through the anode and cathode.

In one embodiment the method may comprise, in any order, the steps of: collecting a condensate in a collector 7; placing an ozone containing gas into the collector 7; wherein the placing comprises mixing bubbles of the ozone containing gas into a mineral water and introducing the mineral water into the collector, the bubbles having a first diameter less than one of: 50 microns, 10 microns, 2 microns, 1 micron, 0.5 microns, and 0.2 microns; wherein the mineral water has an electrical conductivity of at least 300 µS/cm; transforming the condensate into the mineral water by adding into the condensate ions of at least one of: nitrogen, phosphorus, potassium, sulfur, copper, molybdenum, zinc, boron, cobalt, nickel, chlorine, aluminum, silicon, vanadium, and selenium; wherein the mixing comprises using at least one of: a porous diffuser, a mechanical actuator configured to move the mineral water at a high shear rate relative to the gas, a nozzle configured to combine the mineral water and gas at a high relative shear rate, an injector configured to inject the gas into a pressurized portion of the mineral water and a mechanical actuator configured to pressurize and depressurize the pressurized portion of the mineral water, an injector configured to inject the bubbles having a second diameter that is greater than the first diameter and an agitator configured to abruptly break the bubbles having the second diameter into the bubbles having the first diameter, and an electrolysis unit having an anode and cathode; wherein the agitator comprises at least one of: an electric discharge unit having an anode and cathode, an ultrasonic transducer, a mechanical actuator that moves the condensate, structures that cause turbulence in the condensate, and structures that cause a vortex in the condensate.

We claim:

1. An apparatus for in situ collection and treatment of a condensate produced by an operation of climate control equipment, the apparatus comprising:
   a collector for collecting the condensate; and
   an ozone unit configured to place an ozone containing gas into the collector by introducing a mineral water into the collector, wherein the ozone unit comprises a bubble generator that is configured to mix bubbles of the ozone containing gas into the mineral water, the bubbles having a first diameter less than one of: 100 microns, 50 microns, 10 microns, 2 microns, 1 micron, 0.5 microns, and 0.2 microns.

2. The apparatus of claim 1, wherein the ozone unit further comprises a mineralizer configured to transform the condensate into the mineral water by adding into the condensate ions of at least one of: nitrogen, phosphorus, potassium, sulfur, copper, molybdenum, zinc, boron, cobalt, nickel, chlorine, aluminum, silicon, vanadium, and selenium.

3. The apparatus of claim 1, wherein the mineral water has an electrical conductivity of at least 300 µS/cm.

4. The apparatus of claim 1, wherein the bubble generator comprises at least one of: a porous diffuser; a mechanical actuator configured to move the mineral water at a high shear rate relative to the gas; a nozzle configured to combine the mineral water and gas at a high relative shear rate; an injector configured to inject the gas into a pressurized portion of the mineral water and a mechanical actuator configured to pressurize and depressurize the pressurized portion of the mineral water; an injector configured to inject the bubbles having a second diameter that is greater than the first diameter and an agitator configured to abruptly break the bubbles having the second diameter into the bubbles having the first diameter; and an electrolysis unit having an anode and cathode.

5. The apparatus of claim 4, wherein the agitator comprises at least one of: an electric discharge unit having an anode and cathode; an ultrasonic transducer; a mechanical actuator that moves the condensate; and structures that cause turbulence in the condensate.

6. A system for in situ collection and treatment of a condensate produced by an operation of climate control equipment, the system comprising:
   the condensate;
   a collector for collecting the condensate; and
   an ozone unit configured to place an ozone containing gas into the collector by introducing a mineral water into the collector, wherein the ozone unit comprises a bubble generator that is configured to mix bubbles of the ozone containing gas into the mineral water, the bubbles having a first diameter less than one of: 50 microns, 10 microns, 2 microns, 1 micron, 0.5 microns, and 0.2 microns.

7. The system of claim 6, wherein the ozone unit further comprises a mineralizer configured to transform the condensate into the mineral water by adding into the condensate ions of at least one of: nitrogen, phosphorus, potassium, sulfur, copper, molybdenum, zinc, boron, cobalt, nickel, chlorine, aluminum, silicon, vanadium, and selenium.

8. The system of claim 6, wherein the mineral water has an electrical conductivity of at least 300 µS/cm.

9. The system of claim 6, wherein the bubble generator comprises at least one of: a porous diffuser; a mechanical actuator configured to move the mineral water at a high shear rate relative to the gas; a nozzle configured to combine the mineral water and gas at a high relative shear rate; an injector configured to inject the gas into a pressurized portion of the mineral water and a mechanical actuator configured to pressurize and depressurize the pressurized portion of the mineral water; an injector configured to inject the bubbles having a second diameter that is greater than the first diameter and an agitator configured to abruptly break the bubbles having the second diameter into the bubbles having the first diameter; and an electrolysis unit having an anode and cathode.

10. The system of claim 9, wherein the agitator comprises at least one of: an electric discharge unit having an anode and cathode; an ultrasonic transducer; a mechanical actuator that moves the condensate; and structures that cause turbulence in the condensate.

11. A method for in situ collection and treatment of a condensate produced by an operation of climate control equipment, the method comprising the steps of:
collecting the condensate in a collector; and
placing an ozone containing gas into the collector, wherein the placing comprises mixing bubbles of the ozone containing gas into a mineral water, wherein the placing further comprises introducing the mineral water into the collector, the bubbles having a first diameter less than one of: 50 microns, 10 microns, 2 microns, 1 micron, 0.5 microns, and 0.2 microns.

12. The method of claim 11, further comprising the step of transforming the condensate into the mineral water by adding into the condensate ions of at least one of: nitrogen, phosphorus, potassium, sulfur, copper, molybdenum, zinc, boron, cobalt, nickel, chlorine, aluminum, silicon, vanadium, and selenium.

13. The method of claim 11, wherein the mineral water has an electrical conductivity of at least 300 μS/cm.

14. The method of claim 11, wherein the mixing comprises using at least one of: a porous diffuser; a mechanical actuator configured to move the mineral water at a high shear rate relative to the gas; a nozzle configured to combine the mineral water and gas at a high relative shear rate; an injector configured to inject the gas into a pressurized portion of the mineral water and a mechanical actuator configured to pressurize and depressurize the pressurized portion of the mineral water; an injector configured to inject the bubbles having a second diameter that is greater than the first diameter and an agitator configured to abruptly break the bubbles having the second diameter into the bubbles having the first diameter; and an electrolysis unit having an anode and cathode.

15. The method of claim 14, wherein the agitator comprises at least one of: an electric discharge unit having an anode and cathode; an ultrasonic transducer; a mechanical actuator that moves the condensate; structures that cause turbulence in the condensate; and structures that cause a vortex in the condensate.

* * * * *